United States Patent [19]

Otte

[11] Patent Number: 5,586,090
[45] Date of Patent: Dec. 17, 1996

[54] ADAPTER FOR PLAYBACK OF SIGNALS FROM AN AUDIO DEVICE

[75] Inventor: William C. Otte, South Plainfield, N.J.

[73] Assignee: Gemini Industries, Inc., Clifton, N.J.

[21] Appl. No.: 342,149

[22] Filed: Nov. 18, 1994

[51] Int. Cl.$^6$ .................................................. H04B 1/20
[52] U.S. Cl. ............................ 369/2; 369/1; 369/11; 369/12
[58] Field of Search ............................ 369/1, 2, 6, 7, 369/10, 11, 12; 360/137

[56] References Cited

U.S. PATENT DOCUMENTS

| | | | |
|---|---|---|---|
| 3,483,309 | 12/1969 | Kerseg et al. | 174/65 R |
| 3,582,965 | 6/1971 | DeMetrick | 369/11 |
| 3,612,776 | 10/1971 | Ban | 369/11 |
| 3,619,515 | 11/1971 | Lace | 369/11 |
| 3,624,310 | 11/1971 | Mathey | 369/15 |
| 3,644,684 | 2/1972 | Tsuji | 360/94 |
| 3,662,123 | 5/1972 | Huber | 360/94 |
| 3,700,826 | 10/1972 | O'Neal | 360/137 |
| 3,946,156 | 3/1976 | Budrose | 369/1 |
| 3,978,524 | 8/1976 | Gordon et al. | 369/1 |
| 4,034,164 | 7/1977 | Westmoland | 369/11 |
| 4,228,474 | 10/1980 | Neal, Jr. | 360/137 |
| 4,287,388 | 9/1981 | Beer et al. | 381/78 |
| 4,388,660 | 6/1983 | Osanai | 360/110 |
| 4,421,376 | 12/1983 | Cosmos et al. | 439/461 |
| 4,454,551 | 6/1984 | Clausen et al. | 360/137 |
| 4,470,089 | 9/1984 | Hutchins et al. | 360/137 |
| 4,734,897 | 3/1988 | Schotz | 369/2 |
| 5,161,131 | 11/1992 | Borchardt et al. | 369/1 |
| 5,307,326 | 4/1994 | Osawa | 369/2 |
| 5,444,675 | 8/1995 | De Bie et al. | 369/2 |
| B1 4,734,897 | 12/1989 | Schotz | 369/2 |

FOREIGN PATENT DOCUMENTS

| | | |
|---|---|---|
| 0618581A2 | 10/1994 | European Pat. Off. . |
| 54-23701 | 2/1979 | Japan . |
| 839101 | 12/1983 | South Africa . |

OTHER PUBLICATIONS

Sunday Times, Dec. 4, 1983, Published in Johannesburg, South Africa, p. 21.

*Primary Examiner*—David C. Nelms
*Assistant Examiner*—Andrew Q. Tran
*Attorney, Agent, or Firm*—Lerner, David, Littenberg, Krumholz & Mentlik

[57] ABSTRACT

An adapter enables the playback of various audio devices such as compact disc players and the like through a cassette player of either the front or side loading type. The adapter is provided with a user removable partial cover which permits repositioning of its external electrical conductor which is connected to the audio device. In this manner, the electrical conductor may be positioned so as not to interfere with the internal mechanisms within the cassette player during use.

38 Claims, 4 Drawing Sheets

ADAPTER FOR PLAYBACK OF SIGNALS FROM AN AUDIO DEVICE

BACKGROUND OF THE INVENTION

The present invention relates in general to an adapter, and more particularly, to a cassette style adapter for playback of signals produced by an audio device, for example, a compact disc player and the like, to be reproduced by a cassette player of either the front loading or side loading type without interference from the adapter's external electrical conductor which is connected to the audio device.

Today, sound recordings are predominantly reproduced in compact disc and cassette formats. Vinyl records, the traditional LP, have generally become obsolete except for a limited niche market of new recording artists. This dual format between compact discs and cassettes are mutually exclusive. That is, playback equipment which will accommodate compact discs will not typically accommodate cassettes. In certain instances, the playback equipment is provided with a separate playback device for compact discs and one for cassettes. This, obviously, increases the consumer cost in purchasing playback equipment having dual format capability.

In other instances, this dual playback capability is more the exception than the rule. In particular, automobiles typically include a radio having a cassette player as a standard feature. In most cases, a compact disc player is only available as an option in late model cars or as a retrofit at a considerable expense. It is therefore not infrequent that one is unable to play their compact disc collection in their automobile. This necessitates that the user maintain a duplicate collection of selected music, both on compact disc and cassette.

To overcome this problem, there is known from Schotz, U.S. Pat. No. 4,734,897, a cassette adapter which enables signals from a compact disc player to be reproduced as audio sounds by a cassette player. The cassette adapter includes a record head which receives signals to be reproduced from the compact disc player. When the cassette adapter is inserted into the cassette player, its record head is aligned opposing the playback head in the cassette player to enable reproduction of the received signals by the cassette player in the form of audio sounds.

The cassette adapter is connected to the compact disc player by a conventional electrical conductor supporting a headphone jack type connector. In order to enable the cassette adapter to be received within a cassette player of either the front or side loading type, the adapter housing is provided with a plurality of peripheral slots which enable manipulation of the conductor about the periphery of the adapter. This effectively prevents the electrical conductor from interfering with the internal mechanisms of the cassette player, irrespective of its front or side loading design.

Although the Schotz cassette adapter accomplishes its stated objective, it suffers from a number of notable disadvantages. In particular, the slots about the periphery of the adapter are in open communication with one another. As a consequence, it is possible for the electrical conductor to inadvertently move from one location to another either during insertion, playback or removal of the adapter from the cassette player. The inadvertent repositioning of the electrical conductor under any of these circumstances could cause the conductor to entangle itself within the internal mechanisms of the cassette player.

This problem is overcome by the cassette adapter known from Iizuka, Japanese Utility Model Application Serial No. S 52-95789. In Iazuka, like Schotz, the cassette adapter enables its electrical conductor to be repositioned at a plurality of different locations about the periphery of the cassette adapter. However, unlike Schotz, the electrical conductor of Iazuka is semipermanently fixed at each of its respective locations. In order to reposition the electrical conductor from one location to another when confronted with changing from a front loading cassette player to a side loading one, Iazuka requires that the cassette adapter be partially disassembled and reassembled by the user by removing and reattaching its top cover. This necessitates the use of non-standard tools, e.g., miniature screw drivers, which are not typically at the user's disposal when the need arises.

SUMMARY OF THE INVENTION

The present invention is broadly directed to a cassette adapter which is an improvement over that known from Iizuka by making the cassette adapter more user friendly during the partial disassembly and reassembly process required to reposition the electrical conductor.

One object of the present invention is therefore to provide a user friendly cassette adapter which may be partially disassembled and reassembled as required to reposition the electrical conductor by use of standard tools which are more readily available to the user, such as screwdrivers and the like, as well as the edge of a coin or the like.

The present invention specifically describes and discloses an adapter to enable the signals reproduced by an audio device, such as a compact disc player and the like to be reproduced by a cassette player of the front loading or side loading type. The adapter is constructed from a housing which is designed to be at least partially inserted into the cassette player. The housing, via its construction, is divided into first and second interior portions. A first cover encloses the first interior portion and a second cover encloses a second interior portion. The second cover is constructed to be removable by the user after full assembly of the adapter for use within the cassette player. Electronic circuit/record head is provided within the first interior portion of the housing for supplying signals produced by the audio device to the cassette player for reproduction as an audio sound.

An electrical conductor having one end operatively coupled to the electronic circuit/record head and the other end operatively attached to the audio device is provided for transmitting the signals produced by the audio device. The electrical conductor extends from the housing at one of a plurality of peripheral openings adjacent the second cover. The electrical conductor is movable from one of the openings to another of the openings upon removal of the second cover prior to insertion of the adapter into the cassette player. The electrical conductor is secured at the other opening upon reattachment of the second cover to the housing overlying the second interior portion. As a result, the adapter may be inserted within the cassette player of either the front loading or side loading type without interference from the electrical conductor.

In accordance with one embodiment of the present invention, there is disclosed and described an adapter to enable the signals produced by an audio device to be reproduced by a cassette player, the adapter comprising a housing constructed to be at least partially inserted within the cassette player, first and second covers enclosing one open side of the housing, at least the second cover being removable after assembly of the adapter, signal means within the housing for supplying signals produced by the audio device to the cassette player for reproduction as audio signals, electrical means extending from the housing for transmitting the signal produced by the audio device to the signal means, the electrical means extendable from the housing at a plurality of locations, the electrical means moveable from one of the locations to another of the locations upon removal of the second cover, whereby the adapter may be inserted into the cassette player without interference from the electrical means.

In accordance with another embodiment of the present invention there is disclosed and described an adapter to enable the signals produced by an audio device to be reproduced by a cassette player of the front loading or side loading type, the adapter comprising a housing constructed to be at least partially inserted into the cassette player, the housing having a first interior portion and a second interior portion, a first cover enclosing the first interior portion and a second cover enclosing the second interior portion, at least the second cover being user removeable after assembly of the adapter for use within the cassette player, signal means within the first interior portion of the housing for supplying signals produced by the audio device to the cassette player for reproduction as an audio signal, electrical conductor having one end operatively coupled to the signal means and the other end operatively attachable to the audio device for transmitting the signals produced by the audio device to the signal means, the electrical conductor extendable from the housing at a plurality of peripheral locations adjacent the second cover, the electrical conductor moveable from one of the locations to another of the locations upon removal of the second cover prior to insertion of the adapter into the cassette player, the electrical conductor secured at the other of the locations upon reattachment of the second cover to the housing overlying the second interior portion, whereby the adapter may be inserted within the cassette player of the front loading or side loading type without interference from the electrical conductor.

In accordance with another embodiment of the present invention, there is disclosed and described an adapter to enable the signals produced by an audio device to be reproduced by a cassette player of the front loading or side loading type, the adapter comprising a housing constructed to be at least partially inserted into the cassette player, the housing having a first interior portion and a second interior portion, a first cover enclosing the first interior portion and a second cover enclosing the second interior portion, the first cover secured to the housing by a plurality of screws located adjacent the corners of the first cover, at least the second cover being user removeable after assembly of the adapter for use within the cassette player, at least another screw removably securing the second cover to the housing overlying the second interior portion, the another screw being larger than the screws securing the first cover to facilitate removal and reattachment of the second cover by the user of the adapter, signal means within the first interior portion of the housing for supplying signals produced by the audio device to the cassette player for reproduction as an audio signal, electrical conductor having one end operatively coupled to the signal means and the other end operatively attachable to the audio device for transmitting the signals produced by the audio device to the signal means, the electrical conductor extendable from the housing at a plurality of peripheral locations adjacent the second cover, the electrical conductor moveable from one of the locations to another of the locations upon removal of the second cover by means of the another screw prior to insertion of the adapter into the cassette player, the electrical conductor secured at the other of the locations upon reattachment of the second cover by means of the another screw to the housing overlying the second interior portion, whereby the adapter may be inserted within the cassette player of the front loading or side loading type without interference from the electrical conductor.

In accordance with another embodiment of the present invention, there is disclosed and described an adapter to enable the signals produced by an audio device to be reproduced by a cassette player, the adapter comprising a housing constructed to be at least partially inserted within the cassette player, first and second covers enclosing one open side of the housing, the first cover secured to the housing by a plurality of screws having a first size at locations adjacent the corners of the housing the second cover secured to the housing by at least another screw having a second size greater than the first size, at a location remote from the corners of the housing, the second cover being removable after assembly of the adapter, signal means within the housing for supplying signals produced by the audio device to the cassette player for reproduction as audio signals, electrical means extending from the housing for transmitting the signal produced by the audio device to the signal means, the electrical means extendable from the housing at a plurality of locations, the electrical means moveable from one of the locations to another of the locations upon removal and reattachment of the second cover using a standard tool engaging the another screw, whereby the adapter may be inserted into the cassette player without interference from the electrical means.

BRIEF DESCRIPTION OF THE DRAWINGS

The above description, as well as further objects, features and advantages of the present invention will be more fully understood with reference to the following detailed description of an adapter for playback of signals from an audio device, when taken in conjunction with the accompanying drawings, wherein:

FIG. 4 is a top plan diagrammatic illustration, in partial cross-section, of the cassette adapter in operative association with a cassette player for playback of signals produced by an audio device such as a compact disc player and the like.

DETAILED DESCRIPTION OF THE PREFERRED EMBODIMENTS

Figure 1:
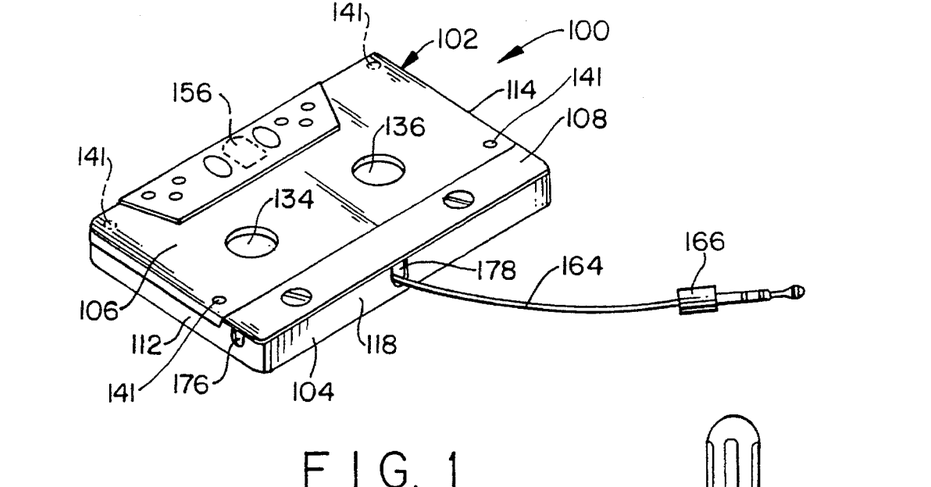
FIG. 1 is a perspective view of a fully assembled cassette adapter constructed in accordance with the present invention.

Referring now to the drawings, wherein like reference numerals represent like elements, there is shown in FIG. 1 a cassette adapter constructed in accordance with the present invention and generally designated by reference numeral 100. The adapter 100 is constructed from a housing 102 formed from a bottom casing 104, a primary top cover 106 and a user removable top cover 108. Although the adapter 100 will be described as of the standard or Phillips type cassette, it can also be in the form of a microcassette, an 8-track cartridge and the like as applicable to correspond to the form of the cassette player being used for playback. The construction of the housing 102 is illustrated in more detail in FIG. 3.

Figure 3:
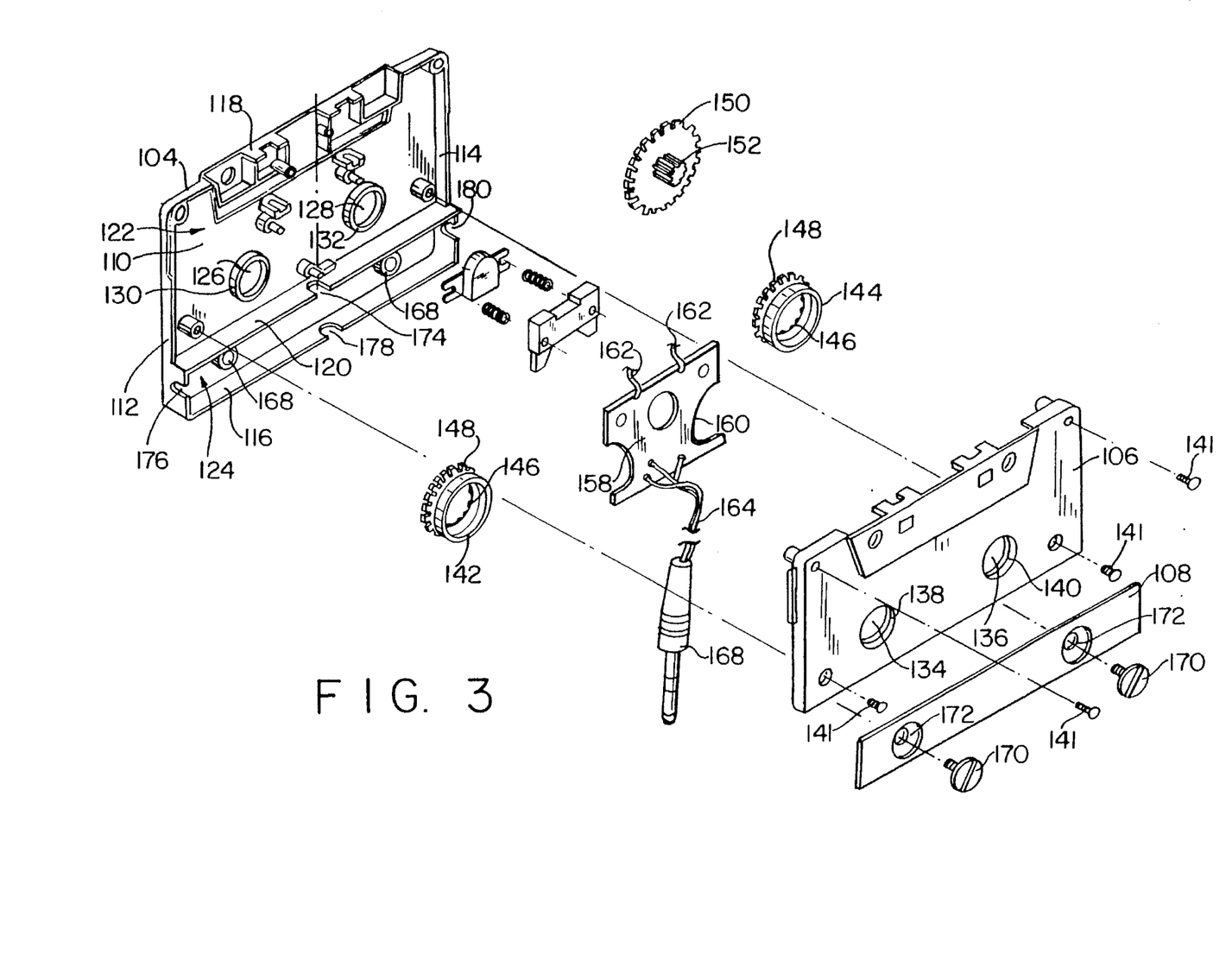
FIG. 3 is an exploded perspective unassembled view of the construction of the cassette adapter in accordance with one embodiment of the present invention.

Referring to FIG. 3, the bottom casing 104 is constructed from a bottom wall 110 surrounded by a pair of opposing sidewalls 112, 114, an endwall 116 and an opposing front wall 118 configured with various recesses and openings as conventional in a cassette such as of the Phillips type. An upstanding dividing wall 120 extends across the bottom wall 110, parallel to endwall 116, thereby dividing the bottom casing 104 into a large first interior portion 122 and a smaller second interior portion 124.

The bottom wall 110 within the first interior portion 122 is provided with a pair of spaced apart openings 126, 128 respectively surrounded by an inwardly extending bushing 130, 132. Correspondingly positioned openings 134, 136, similarly surrounded by bushings 138, 140, are positioned within the primary top cover 106. The first interior portion 122 of the bottom casing 104 is enclosed by securing the primary top cover 106 overlying therewith by means of suitable screws 141 and the like located at the four corners of the primary top cover. The screws 141 are of miniature size to enable their location as close as possible to the four corners of the primary top cover 106. This location ensures maximum rigidity when securing the primary top cover 106 to the bottom casing 104, and hence the overall adapter 100. As the screws 141 are typically only about 3.5 mm in diameter, they are inserted using a jeweler's screwdriver or the like. Although it is possible to use larger screws 141 adapted for use with conventional size screwdrivers, this would necessitate their positioning inwardly from the corners of the housing 100, with a potential loss of rigidity.

With the primary top cover 106 in place, the respective openings 126, 128 and 134, 136 and respective bushings 130, 132 and 138, 140 are arranged in a corresponding alignment with each other. The aligned bushings 130, 138 and 132, 140 rotationally journal a pair of cassette hub/gear elements 142, 144. Each of the cassette hub/gear elements 142, 144 include a plurality of inner teeth 146 and outer teeth 148. The outer teeth 148 of each of the cassette hub/gear elements 142, 144 are meshed with the peripheral teeth 150 of a centrally disposed, rotatably journaled, intermediate gear 152. Hence, rotation of either one of the cassette hub/gear elements 142, 144 will affect rotation of the other cassette hub/gear element by virtue of intermediate gear 152.

Opposing an opening 154 centrally located within front wall 118 is a spring biased record head 156 held in place by a bracket 157. The record head 156 is spring biased to enable movement inwardly and outwardly for engaging the playback head within the cassette player. The record head 156 is preferably a stereophonic record head capable of recording two channels, left and right channels, of the audio signals. The record head 156 is also compatible with conventional playback heads normally used in cassette players having auto-reverse capability. The record head 156 is connected to an electronic circuit 158 supported on a printed circuit board 160 by means of electrical wires 162. The electronic circuit 158 is, in turn, connected to an electrical conductor 164 extending from the adapter 100 and terminating at its free end by, for example, a headphone jack type plug 166. The plug 166 is a conventional stereophonic plug which is receivable by a compatible jack within the audio device such as the compact disc player. The assembled relationship of the thus far described components of the adapter 100 is graphically illustrated in FIG. 4.

A pair of spaced apart upstanding internally threaded bosses 168 extend from the bottom wall 110 within the second interior portion 124 of the bottom casing 104. The bosses are adapted to receive screws 170 extending through openings 172 within the user removeable top cover 108 for removably attaching the cover overlying the second interior portion 124. The screws 170 have enlarged heads, e.g., about 6–10 mm, and preferably about 9 mm, to enable use of a conventional size screwdriver 173, coin edge 175 or the like. This facilitates removal and reattachment of the user removeable top cover 108 when repositioning the electrical conductor 164. The second interior portion is essentially empty as the operative components of the adapter 100 are confined within the first interior portion 122.

It will be appreciated that the ability to remove the removeable top cover 108 by means of a standard size screwdriver 173 or coin edge 175 is a great advantage. In this regard, it is most likely that the user of the cassette adapter 100 will have a coin available to remove the removable top cover 108 when it is desired to reposition the electrical conductor 164. Hence, the use of enlarged screws 170 provides a user friendly quality to the adapter 100 when required for partial disassembly and reassembly in repositioning the electrical conductor 164.

The electrical conductor 164 passes through a U-shaped opening 174 within the dividing wall 120. Similarly, the electrical conductor 164 is adapted to extend from the housing 102 through any one of a plurality of openings such as U-shaped openings 176, 178, 180 individually arranged on the opposing sidewalls 112, 114 and endwall 116. U-shaped openings 176, 180 are positioned adjacent the endwall 116 within a portion of the sidewalls 112, 114 of increased width with respect to the remaining portion of the sidewalls which support the primary top cover 106. The electrical conductor 164 may be positioned to extend through any one of the U-shaped openings 176, 178, 180 as desired by the user.

Figure 4:
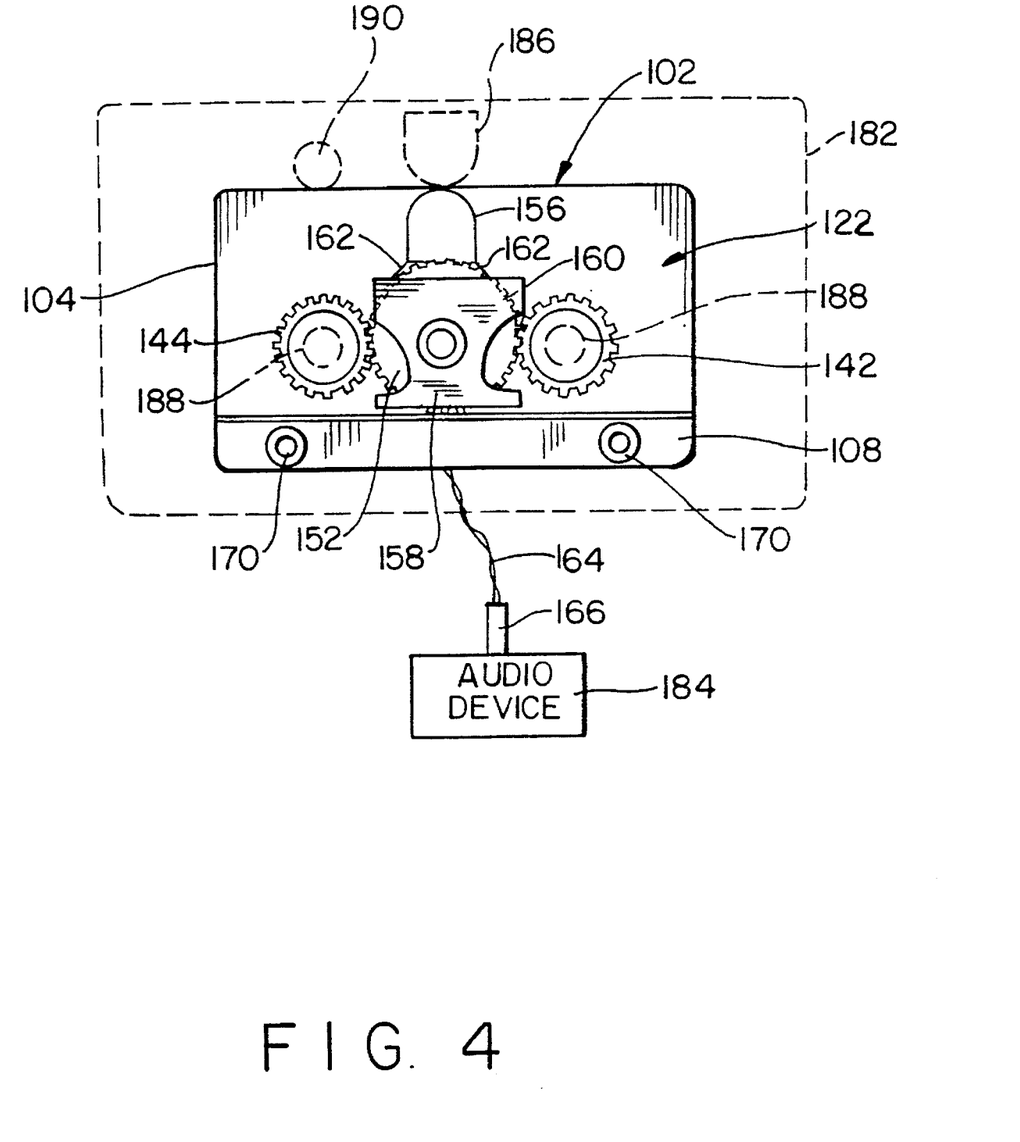

For example, as shown in FIG. 4, the adapter 100 in its initial fully assembled form may be provided with the electrical conductor 164 extending outwardly through the U-shaped opening 178 within the endwall 116. This enables the adapter 100 to be inserted into a front-loading cassette player 182 without interference of the electrical conductor with the internal mechanisms within the cassette player. The plug 166 is freely connected to the audio device 184, such as a compact disc player, television, CB radio, short wave radio and the like. With the adapter 100 inserted into the cassette player 182, its record head 156 is arranged opposing the playback head 186 of the cassette player. The capstans 188 of the cassette player 182 are received in meshed engagement with the inner teeth 146 of the respective cassette hub/gear elements 142, 144.

Signals generated from the audio device 184, such as the compact disc player, are applied to the electronic circuit 158 on the printer circuit board 160 by means of the electrical conductor 164. The applied signals are transferred to the record head 156 by means of wires 162, and subsequently to the playback head 186 within the cassette player 182 for reproduction as audio sounds.

Figure 2:
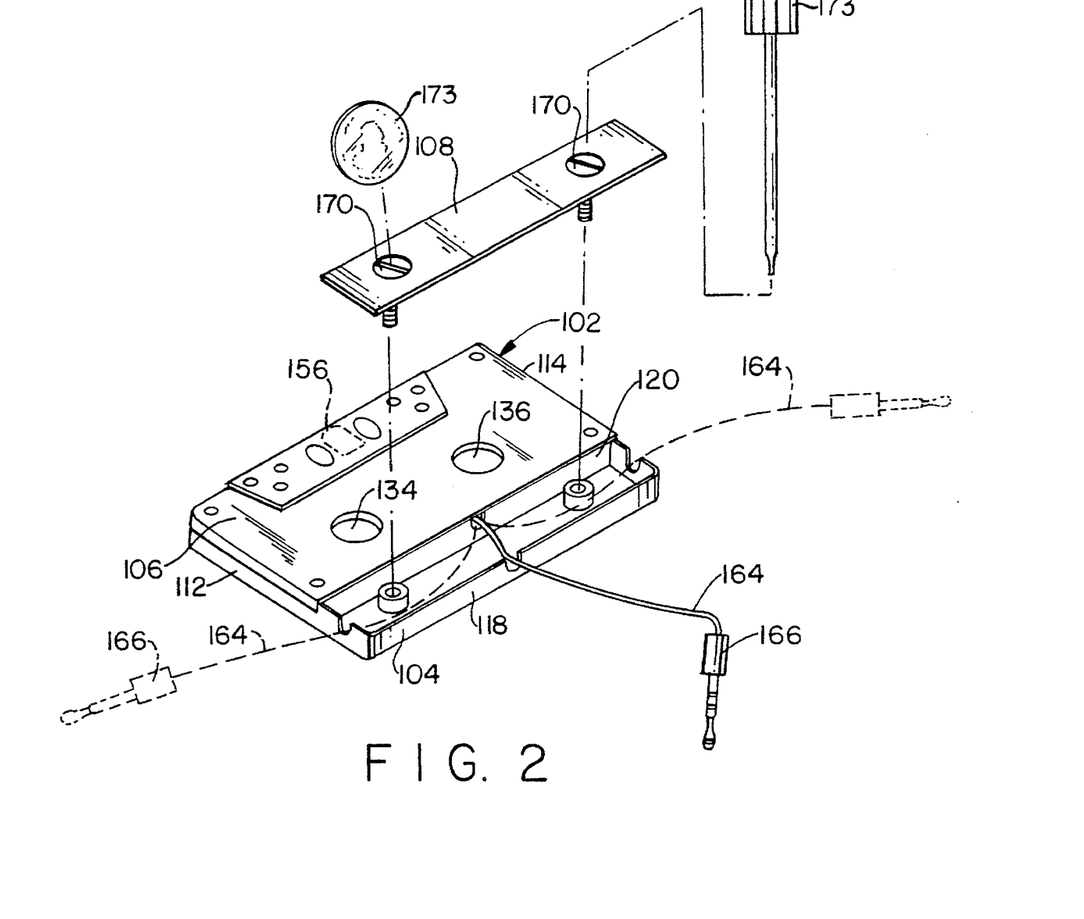
FIG. 2 is a perspective view of the cassette adapter of the present invention being partially disassembled to enable repositioning of the electrical conductor from one peripheral location to another.

In the event the adapter 100 is desired for use in a cassette player 182 of the side loading type, left or right, it is necessary that the electrical conductor 164 be repositioned. The repositioning of the electrical conductor 164 requires the partial disassembly of the adapter 100 from its fully assembled form. This is accomplished by first removing the user removable top cover 108 by means of screws 170. Next, the electrical conductor is repositioned into another of the U-shaped openings 176, 180. Thereafter, the adapter 100 is reassembled by securing the user removable top cover 106 overlying the second interior portion 124, once again, by means of screws 170 which are threadably received within bosses 168. The alternative arrangements for the electrical conductor 164 is shown in phantom in FIG. 2. In this manner, the adapter 100 of the present invention is suitable for use in a variety of cassette players 182 of either the front or side loading type. By partially disassembling the adapter 100, via removal of the user removable top cover 108, the electrical conductor 164 can be repositioned to extend from either of the sidewalls, 112, 114 or endwall 116 to prevent interference with the internal mechanisms within the cassette player 182.

The intermediate gear 152 functions to disenable the automatic shut-off sensing device that may be included in the cassette player 182 and also the automatic reversing device in which the end of the cassette tape is sensed by detecting stationary cassette hub/gear elements 142, 144 during the playback mode. Thus, the intermediate gear 154 enables the adapter 100 to operate normally in the absence of a tape being transported by the capstan 188 and pinch roller 190 (see FIG. 4) as typical of cassette players. Also, the intermediate gear 152 ensures that the two cassette hub/gear elements 142, 144 continued to simultaneously rotate at the same speed to prevent operation of the shut-off mechanism which might exist in the cassette player 182. In particular, in some cassette players 182, if the cassette player senses that either of the two cassette hub/gear elements 142, 144 are not rotating synchronously, the cassette player will automatically shut off. A similar assembly for this purpose is known, for example, from Clausen, et al., U.S. Pat. No. 4,454,551.

Figure 5:
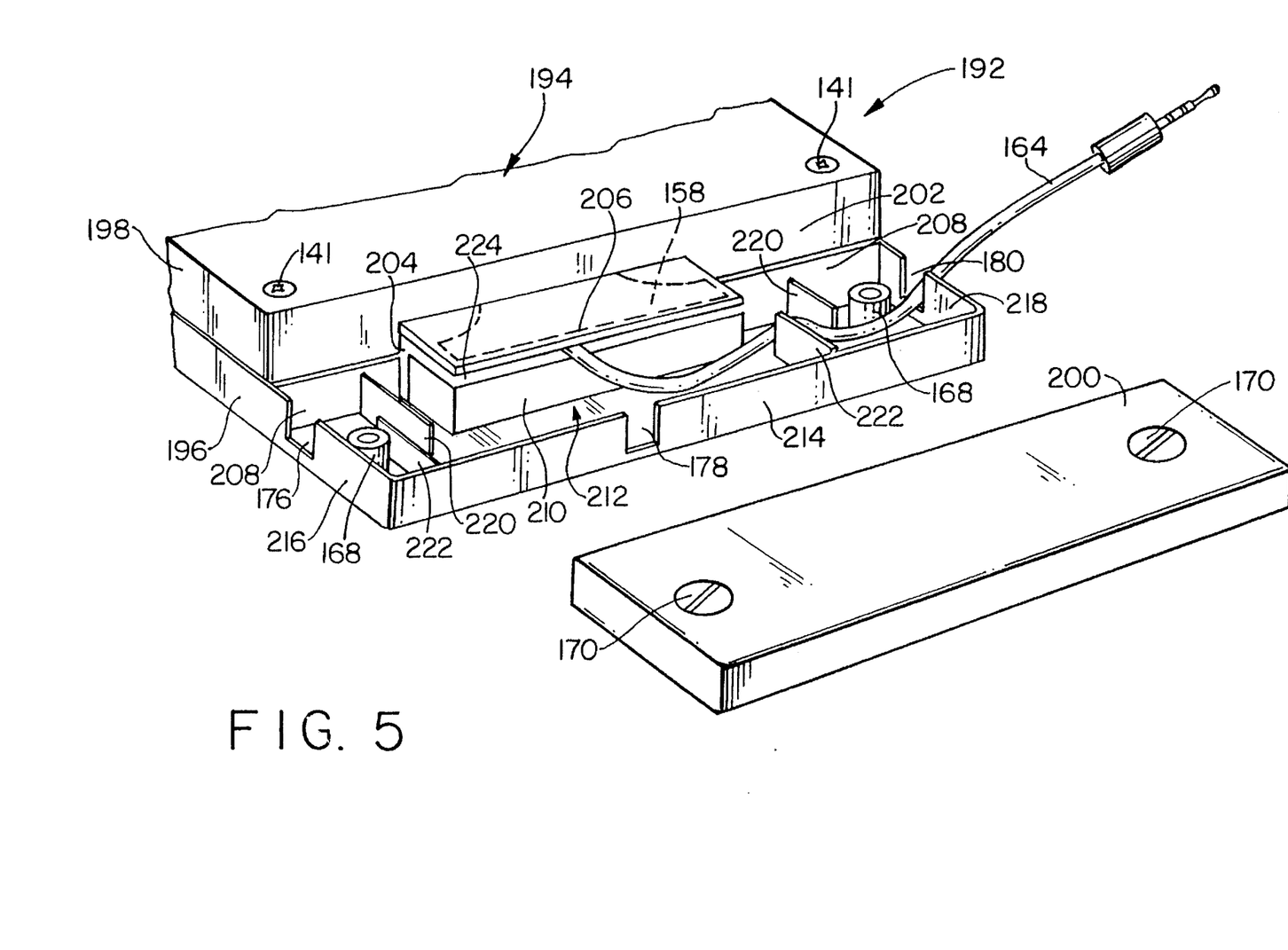
FIG. 5 is a partial perspective view of a cassette adapter in accordance with another embodiment of the present invention being partially disassembled to enable repositioning of the electrical conductor from one peripheral location to another.

Referring now to FIG. 5, there is disclosed another embodiment of the cassette adapter constructed in accordance with the present invention and generally designated by reference numeral 192. The adapter 192 is constructed from a housing 194 including a bottom casing 196, a primary top cover 198 and a user removable top cover 200. The primary top cover 198 includes a vertical endwall 202 provided with a centrally arranged elongated notch 204 over which there is arranged a horizontal plate 206. The bottom casing 196 is provided with a pair of spaced apart upstanding dividing walls 208 having a gap therebetween which is covered by a generally U-shaped dividing wall 210 which projects into the interior portion 212. The interior portion 212 is surrounded by an endwall 214 and two adjacent sidewalls 216, 218. Similarly arranged in the endwall 214 and sidewalls 216, 218 are a plurality of openings 176, 178, 180. Adjacent the spaced apart upstanding internally threaded bosses 168 are pairs of vertical electrical cord locking walls 220, 224. One locking wall 220 extends from each of the dividing walls 208, while the other locking wall 222 extends from the endwall 214 to form a parallel space therebetween.

The electrical conductor 164 extends outwardly through the narrow opening 224 provided between the plate 206 and top of U-shaped dividing wall 210 as a result of the height differential resulting from the presence of the elongated notch 204. In the alternative, an opening (not shown) may be provided in U-shaped dividing wall 210 in a similar manner to openings 176, 178, 180. In either event, the electrical conductor extends into the interior 212 and outwardly to one of the openings 176, 178, 180. When the electrical conductor extends through the side openings 176, 180, it may be snaked between and around the locking walls 220, 222 to prevent the electrical conductor from being pulled out from the interior of the adapter 192 inadvertently. The locking walls 222, 224 function like an electrician's knot. A similar pair of locking walls 220, 222 (not shown) may also be provided for use when the electrical conductor 164 is desired to extend outwardly from opening 178 within the endwall 214. The use of the cassette adapter 192 and its partial disassembly and reassembly to reposition the electrical conductor 164 is as previously described with respect to the cassette adapter 100.

Although the invention herein has been described with reference to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. An adapter to enable signals produced by an audio device to be reproduced by a cassette player, said adapter comprising a housing constructed to be at least partially inserted within said cassette player, first and second covers enclosing one open side of said housing, at least said second cover being removable after assembly of said adapter, electrical means extending from said housing for receiving signals produced by said audio device to be sent to said cassette player for reproduction, said electrical means extendable from said housing at a plurality of locations, said electrical means moveable from one of said locations to other of said locations upon removal of said second cover, whereby said adapter may be inserted into said cassette player without interference by the presence of said electrical means.

2. The adapter of claim 1, further including signal means within said housing for supplying signals produced by said audio device to said cassette player for reproduction as audio signals.

3. The adapter of claim 1, wherein said signal means comprises an electronic circuit operatively coupled to a record head.

4. The adapter of claim 1, wherein said housing includes a bottom casing divided into first and second interior portions by a dividing wall.

5. The adapter of claim 4, wherein said first cover encloses said first interior portion and said second cover encloses said second interior portion.

6. The adapter of claim 5, wherein said dividing wall has an opening through which said electrical means extends from said first interior portion into said second interior portion.

7. The adapter of claim 5, wherein said signal means is arranged within said first interior portion.

8. The adapter of claim 5, further including means within said second interior portion for removably securing said second cover thereto.

9. The adapter of claim 5, wherein said bottom casing includes a peripheral wall having an end and opposing sides bounding said second interior portion, said peripheral wall including a plurality of openings, said electrical means being repositionable from one of said openings to another of said openings upon removal of said second cover.

10. The adapter of claim 9, wherein said second cover when enclosing said second interior portion prohibiting said electrical means from being moveable from one of said openings to another of said openings.

11. The adapter of claim 9, wherein said plurality of openings are arranged on said one end and on said opposing sides of said peripheral wall.

12. The adapter of claim 1, wherein said electrical means comprises an electrical conductor having one end attached to said signal means and the other end attached to a plug for connection to said audio device.

13. The adapter of claim 1, wherein said audio device comprises a compact disc player.

14. The adapter of claim 1, wherein said plurality of locations comprise a plurality of openings arranged about the periphery of said housing adjacent said second cover.

15. An adapter to enable signals produced by an audio device to be reproduced by a cassette player of the front loading or side loading type, said adapter comprising a housing constructed to be at least partially inserted into said cassette player, said housing having a first interior portion and a second interior portion, a first cover enclosing said first interior portion and a second cover enclosing said second interior portion, at least said second cover being user removeable after assembly of said adapter for use within said cassette player, electrical conductor extending from said second interior portion having one end operatively attachable to said audio device for receiving signals produced by said audio device to be sent to said cassette player for reproduction, said electrical conductor extendable from said housing at a plurality of peripheral locations adjacent said second cover, said electrical conductor moveable from one of said locations to other of said locations upon removal of said second cover prior to insertion of said adapter into said cassette player, said electrical conductor secured at the other of said locations upon reattachment of said second cover to said housing overlying said second interior portion, whereby said adapter may be inserted within said cassette player of the front loading or side loading type without interference by the presence of said electrical conductor.

16. The adapter of claim 15, further including signal means within said first interior portion of said housing for supplying signals produced by said audio device to said cassette player for reproduction as an audio signal.

17. The adapter of claim 16, wherein said signal means comprises an electronic circuit operatively coupled to a record head.

18. The adapter of claim 15, wherein said housing includes a dividing wall dividing said housing into said first and second interior portions.

19. The adapter of claim 18, wherein said dividing wall has an opening through which said electrical conductor extends from said first interior portion into said second interior portion.

20. The adapter of claim 15, further including means within said second interior portion for removably securing said second cover thereto.

21. The adapter of claim 15, wherein said housing includes a peripheral wall having an end and opposing sides bounding said second interior portion, said peripheral wall including a plurality of openings corresponding to said locations through which said electrical conductor is repositionable from one of said openings to another of said openings upon removal of said second cover.

22. The adapter of claim 21, wherein said second cover when enclosing said second interior portion, prohibits said electrical conductor from being moveable from one of said openings to another of said openings.

23. The adapter of claim 21, wherein said plurality of openings are arranged on said one end and on said opposing sides of said peripheral wall.

24. The adapter of claim 15, wherein said audio device comprises a compact disc player.

25. The adapter of claim 15, wherein said adapter is in the configuration of a cassette.

26. The adapter of claim 15, wherein said second interior portion is substantially empty.

27. An adapter to enable signals produced by an audio device to be reproduced by a cassette player of the front loading or side loading type, said adapter comprising a housing constructed to be at least partially inserted into said cassette player, said housing having a first interior portion and a second interior portion, a first cover enclosing said first interior portion and a second cover enclosing said second interior portion, said first cover secured to said housing by a plurality of screws located adjacent the corners of said first cover, at least said second cover being user removeable after assembly of said adapter for use within said cassette player, at least another screw removably securing said second cover to said housing overlying said second interior portion, said another screw being larger than said screws securing said first cover to facilitate removal and reattachment of said second cover by the user of said adapter, electrical conductor extending from said second interior portion having one end operatively attachable to said audio device for receiving signals produced by said audio device to be sent to said cassette player for reproduction, said electrical conductor extendable from said housing at a plurality of peripheral locations adjacent said second cover, said electrical conductor moveable from one of said locations to other of said locations upon removal of said second cover by means of said another screw prior to insertion of said adapter into said cassette player, said electrical conductor secured at the other of said locations upon reattachment of said second cover by means of said another screw to said housing overlying said second interior portion, whereby said adapter may be inserted within said cassette player of the front loading or side loading type without interference by the presence of said electrical conductor.

28. The adapter of claim 27, further including signal means within said first interior portion of said housing for supplying signals produced by said audio device to said cassette player for reproduction as an audio signal.

29. The adapter of claim 27, wherein said screws securing said first cover are smaller than said another screw removably securing said second cover.

30. The adapter of claim 27, wherein said another screw removably securing said second cover is engageable for removal by a standard size screwdriver.

31. The adapter of claim 27, wherein said another screw removably securing said second cover is engageable for removal by the edge of a coin.

32. An adapter to enable signals produced by an audio device to be reproduced by a cassette player, said adapter comprising a housing constructed to be at least partially inserted within said cassette player, first and second covers enclosing one open side of said housing, said first cover secured to said housing by a plurality of screws having a first size at locations adjacent the corners of said housing, said second cover secured to said housing by at least another screw having a second size greater than said first size, at a location remote from the corners of said housing, said second cover being removable after assembly of said adapter, electrical means extending from said housing for receiving signals produced by said audio device to be sent to said cassette player for reproduction, said electrical means extendable from said housing at a plurality of locations, said electrical means moveable from one of said locations to another of said locations upon removal and reattachment of said second cover using a conventional size tool engaging said another screw, whereby said adapter may be inserted into said cassette player without interference by the presence of said electrical means.

33. The adapter of claim 32, further including signal means within said housing for supplying signals produced by said audio device to said cassette player for reproduction as audio signals.

34. The adapter of claim 32, wherein said tool comprises a standard size screwdriver.

35. The adapter of claim 32, wherein said tool comprises a coin edge.

36. The adapter of claim 32, wherein said another screw has a head about 6–10 mm in size.

37. The adapter of claim 32, wherein said another screw has a head about 9 mm in size.

38. The adatper of claim 32, wherein said plurality of screws have a size of about 3.5 mm.

* * * * *

UNITED STATES PATENT AND TRADEMARK OFFICE
CERTIFICATE OF CORRECTION

PATENT NO. : 5,586,090
DATED      : December 17, 1996
INVENTOR(S): William C. Otte It is certified that error appears in the above-indentified patent and that said Letters Patent is hereby corrected as shown below:

Column 8, line 44, change "1" to read --2--.

Column 8, line 47, change "1" to read --2--.

Column 9, line 8, change "1" to read --2--.

Signed and Sealed this

Second Day of September, 1997

Attest:

BRUCE LEHMAN

Attesting Officer

Commissioner of Patents and Trademarks